United States Patent
Usui

(10) Patent No.: US 8,155,796 B2
(45) Date of Patent: Apr. 10, 2012

(54) PROTECTIVE RELAY DEVICE

(75) Inventor: Masaji Usui, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 365 days.

(21) Appl. No.: 12/489,835

(22) Filed: Jun. 23, 2009

(65) Prior Publication Data

US 2010/0204846 A1 Aug. 12, 2010

(30) Foreign Application Priority Data

Feb. 9, 2009 (JP) .................................. 2009-027797

(51) Int. Cl.
*H02H 3/00* (2006.01)
(52) U.S. Cl. ........................................ 700/294; 700/292
(58) Field of Classification Search .................... 700/294
See application file for complete search history.

(56) References Cited

U.S. PATENT DOCUMENTS

| 4,322,768 | A | * | 3/1982 | Maeda et al. | 361/64 |
| 6,112,136 | A | * | 8/2000 | Paul et al. | 700/293 |
| 6,154,687 | A | * | 11/2000 | Hart et al. | 700/294 |
| 6,618,648 | B1 | | 9/2003 | Shirota et al. | |
| 6,845,333 | B2 | * | 1/2005 | Anderson et al. | 702/65 |
| 6,985,800 | B2 | * | 1/2006 | Rehtanz et al. | 700/292 |
| 7,519,454 | B2 | * | 4/2009 | Gardner et al. | 700/286 |
| 2011/0013676 | A1 | * | 1/2011 | Fukushima et al. | 375/211 |

FOREIGN PATENT DOCUMENTS

| EP | 1 715 354 | 10/2006 |
| JP | 62-262615 A | 11/1987 |
| JP | 02-113746 A | 4/1990 |
| JP | 07-131923 A | 5/1995 |
| JP | 11-341706 A | 12/1999 |
| JP | 2000-152486 A | 5/2000 |
| JP | 2001-109781 A | 4/2001 |

OTHER PUBLICATIONS

Combined Search and Examination Report issued in corresponding United Kingdom Application No. GB0911419.0 dated Oct. 26, 2009.

* cited by examiner

*Primary Examiner* — Ryan Jarrett
(74) *Attorney, Agent, or Firm* — Buchanan Ingersoll & Rooney PC

(57) ABSTRACT

Data from a digitizing unit is stored in a time-series data buffer, via a data receiving circuit. The data on which a digital filtering process is performed by a digital filtering processing circuit is stored in time series in a time-series instantaneous-value data storing circuit. A digital computing unit sets a time of temporally oldest data from among a group of latest time data stored in a latest time-data storing circuit as a reference time, extracts time data having the same time as the reference time from the time-series instantaneous-value data storing circuit, and then performs a digital computation.

7 Claims, 6 Drawing Sheets

PROTECTIVE RELAY DEVICE

BACKGROUND OF THE INVENTION

1. Field of the Invention

The present invention relates to a protective relay device for protecting an electric power system.

2. Description of the Related Art

Japanese Patent Application Laid-open No. H07-131923 discloses a correction technique when, although sampling synchronization is maintained, there is a mismatch in sampling timing or, in other words, when there is a phase error. More particularly, although the correction technique is intended to perform a variety of corrections including correction of errors in, for example, an analog filter, it is also effective in correction of a mismatch only in sampling timing.

Moreover, Japanese Patent Application Laid-open No. S62-262615 discloses a technique of securing sampling synchronization of a digitizing unit that digitizes system electrical quantities at two places.

Furthermore, Japanese Patent Application Laid-open No. H02-113746 discloses a technique of securing sampling synchronization of a digitizing unit that digitizes a plurality of system electrical quantities in synchronous network communication; while Japanese Patent Application Laid-open No. 2000-152486 discloses a technique of securing sampling synchronization of a digitizing unit that digitizes a plurality of system electrical quantities in asynchronous network communication.

In each of the abovementioned conventional techniques, a digitizing unit that digitizes a system electrical quantity and a digital computing unit that performs digital computation by the use of digitized data are maintained in synchronization. Thus, the abovementioned conventional techniques are applicable to a type of system in which sampling synchronization is maintained in advance or to a type of system in which sampling synchronization is secured.

For example, in the correction technique disclosed in Japanese Patent Application Laid-open No. H07-131923, relay computation is performed by activating a software for relay computation as soon as a plurality of analog-to-digital (AD) converting units in the same apparatus releases output. In that case, the timing of releasing output from each AD converting unit is maintained in sampling synchronization. Thus, the system disclosed in Japanese Patent Application Laid-open No. H07-131923 is the "type of system in which sampling synchronization is maintained in advance". In such a system, relay computation is performed in a periodic manner with a certain time interval maintained for each turn of relay computation.

In the technique disclosed by Japanese Patent Application Laid-open No. 2000-152486, sampling synchronization is not maintained because an asynchronous communication network is used for transferring system electrical quantities. However, because relay computation is started after all of the output from a digitizing unit, which digitizes a plurality of system electrical quantities, has arrived, continuity of the relay computation is secured. Thus, the system disclosed in Japanese Patent Application Laid-open No. 2000-152486 is the "type of system in which sampling synchronization is secured".

However, when sampling frequencies are different for digitizing units that digitize a plurality of system electrical quantities, i.e., in the case of a type of system in which sampling synchronization is not secured, following problems arise.

For example, assume that sampling frequencies are different for digitizing units. Generally, an analog filter in each digitizing unit has sufficient attenuation characteristics to remove loopback errors based on the sampling theorem. For this reason, when data to be used in computation is obtained after performing correction on different data at closer times from among data that is sampled at different sampling frequencies, the high frequency characteristics of the relay apparatus get affected. That makes it difficult to commoditize digital filters. As a result, it becomes necessary to arrange a digital filter corresponding to a frequency of a computation cycle for each sampling frequency. That results in an increase in the size and the manufacturing cost of the apparatus.

Moreover, when sampling frequencies are different for digitizing units and when relay computation is started after all of the output from the digitizing units have arrived, a mismatch occurs with time in the output timing of the digitizing units. That causes an increase in the phase error between the output of each digitizing unit and loss of data used in periodic relay computation.

Meanwhile, the case of non-identical sampling frequencies of digitizing units also includes a situation when there is only a slight difference in the sampling frequencies. For example, consider a case when a first digitizing unit performs AD conversion at an integral multiple of 60.000 hertz and a second digitizing unit performs AD conversion at an integral multiple of 60.001 hertz. In such a case, the sampling frequencies match at certain times thereby enabling to secure time interval for relay computation. However, the time interval for relay computation goes on decreasing with time thereby causing an increase in the phase error between the output of each digitizing unit and loss of data. That results in the occurrence of abovementioned problems.

SUMMARY OF THE INVENTION

It is an object of the present invention to at least partially solve the problems in the conventional technology.

According to one aspect of the present invention, there is provided a protective relay device including a data receiving circuit that receives data from a plurality of digitizing units each digitizing a system electrical quantity; a plurality of data buffer circuits each storing therein the data received by the data receiving circuit in time series for each of the digitizing units; a plurality of digital filtering processing circuits each performing a predetermined digital filtering process on an output of each of the data buffer circuits; a plurality of first data storing circuits each storing therein an output of each of the digital filtering processing circuits in time series as time data; a plurality of second data storing circuits each storing therein latest time data for each of the digitizing units from among time data stored in each of the first data storing circuits; and a digital computing unit that sets an oldest time from among latest times represented by the latest time data stored in the second data storing circuits as a reference time, extracts data at a same time as the reference time from the first data storing circuits, and performs a protective computation with extracted data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The present invention is not limited to these exemplary embodiments.

Figure 1:
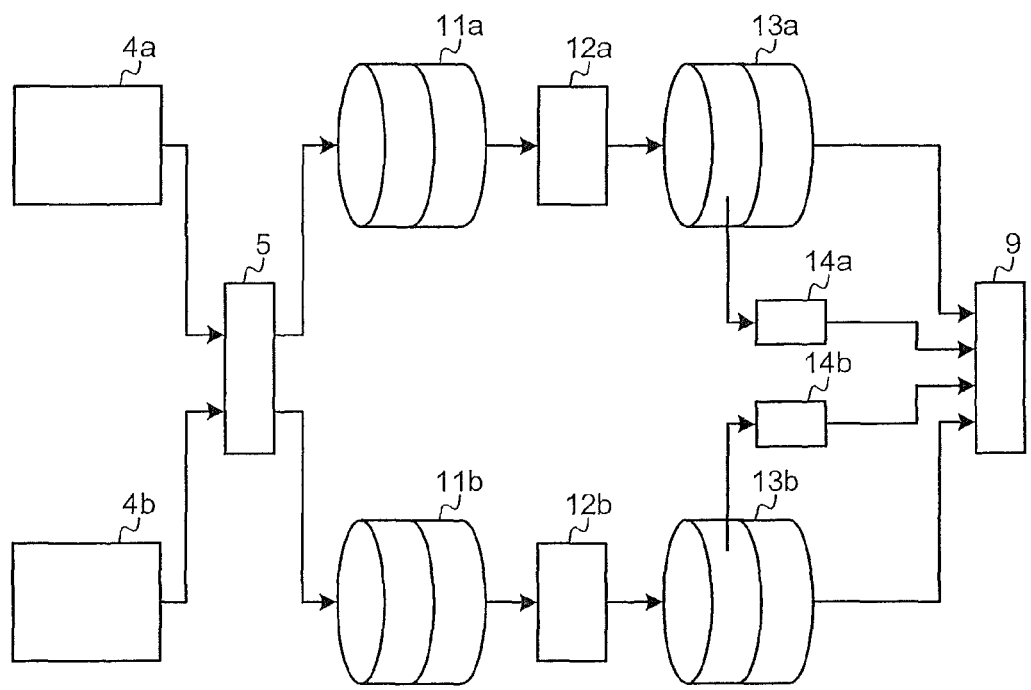
FIG. 1 is a schematic diagram of an exemplary functional configuration of a protective relay device according to a first embodiment of the present invention.

FIG. 1 is a schematic diagram of an exemplary functional configuration of a protective relay device according to a first embodiment of the present invention. According to the first embodiment, the protective relay device includes a digitizing unit 4 (4a and 4b), a data receiving circuit 5, a time-series data buffer circuit 11 (11a and 11b), a digital filtering processing circuit 12 (12a and 12b), a time-series instantaneous-value data storing circuit 13 (13a and 13b), a latest time-data storing circuit 14 (14a and 14b), and a digital computing unit 9. In the example shown in FIG. 1, the protective relay device is configured in two series corresponding to the two digitizing units 4a and 4b, it is not a necessity. That is, it is also possible to configure the protective relay device by arranging each of the time-series data buffer circuit 11, the digital filtering processing circuit 12, the time-series instantaneous-value data storing circuit 13, and the latest time-data storing circuit 14 in singularity.

The digitizing units 4a and 4b perform digitization of a plurality of system electrical quantities and output digitized data. The data receiving circuit 5 temporarily stores therein the digitized data output by the digitizing units 4a and 4b and, depending on the contents of the digitized data, distributes it among the time-series data buffer circuits 11a and 11b that are arranged corresponding to the digitizing units 4a and 4b, respectively. The time-series data buffer circuits 11a and 11b are circuits (buffer circuits) that store therein in temporal sequence the data received from the data receiving circuit 5. The digital filtering processing circuits 12a and 12b perform filtering process on the data output by the time-series data buffer circuits 11a and 11b, respectively. The time-series instantaneous-value data storing circuits 13a and 13b are circuits (buffer circuits) that store therein in temporal sequence the data subjected to filtering process by the digital filtering processing circuits 12a and 12b, respectively. The latest time-data storing circuits 14a and 14b extract and retain latest time data from data of sampling times (hereinafter, "sampling time data" or "time data") stored in the time-series instantaneous-value data storing circuits 13a and 13b, respectively. Based on time information of the time data stored in the latest time-data storing circuits 14a and 14b, the digital computing unit 9 performs a necessary digital computation by the use of the data extracted from the time-series instantaneous-value data storing circuits 13a and 13b.

Figure 2:
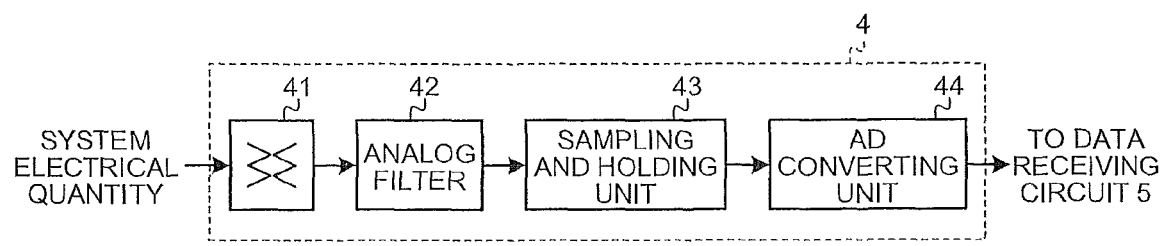
FIG. 2 is a schematic diagram of an exemplary configuration of a digitizing unit shown in FIG. 1.

FIG. 2 is a schematic diagram of an exemplary configuration of the digitizing unit 4. The digitizing unit 4 includes an input transducer 41, an analog filter 42, a sampling and holding unit 43, and an analog-to-digital (AD) converting unit 44. As shown in FIG. 2, the system electrical quantity input to the digitizing unit 4 is sent to the analog filter 42 via the input transducer 41. The analog filter 42 removes loopback errors based on the sampling theorem. The sample holder 43 performs sampling of analog data at a certain time determined according to sampling frequency. The AD converting unit 44 performs analog-to-digital conversion and stores digitized data in the data receiving circuit 5 (see FIG. 1).

Figure 3:
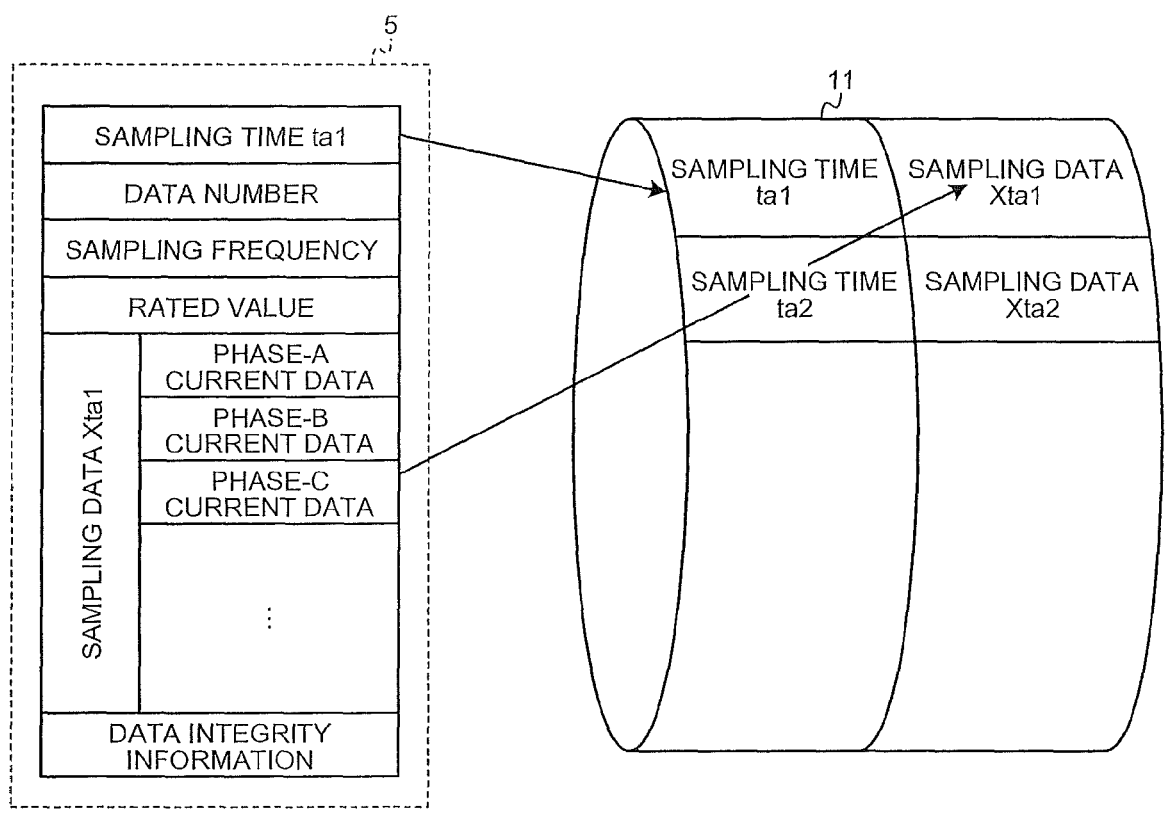
FIG. 3 is a schematic diagram of an image of storing data in a data receiving circuit and a time-series data buffer circuit shown in FIG. 1.

FIG. 3 is a schematic diagram of an image of storing data in the data receiving circuit 5 and the time-series data buffer circuit 11. As shown in FIG. 3, the data receiving circuit 5 receives various types of data, namely, sampling time data, data numbers, sampling frequencies, rated values, sampling data, and data integrity information. In the time-series data buffer circuit 11, sampling data (current data, voltage data, etc.) corresponding to the sampling time data is stored in temporal sequence. Meanwhile, from among such stored information, the information regarding the sampling time data, the sampling frequencies, and the rated values was not considered necessary in the abovementioned conventional techniques.

Given below is the description of operations in the protective relay device with reference to FIGS. 1 to 3. First, the data receiving circuit 5 receives digitized data from the digitizing unit 4a and stores the received data in the time-series data buffer circuit 11a according to the data classification (series). The time-series data buffer circuit 11a sends the stored data to the digital filtering processing circuit 12a, which performs filtering process on the data and stores it in the time-series instantaneous-value data storing circuit 13a. Similarly, digitized data output by the digitizing unit 4b is stored in the time-series data buffer circuit 11b via the data receiving circuit 5. The sequence of the abovementioned operations is substantially identical to the sequence of operations in a conventional protective relay device. However, consider a case when the digitizing unit 4a and the data receiving circuit 5 are not arranged in the same apparatus. In such a case, the physical distance between the digitizing unit 4 and the data receiving circuit 5 as well as the data transfer routes are different. Consequently, even if data at an identical sampling time is transferred, there is a possibility that a time difference occurs between arrivals of the data at the data receiving circuit 5.

In the conventional protective relay device, a digital computing unit is activated after all of the data reaches a data storing circuit. However, in such a control method, the computing time of the digital computing unit is restricted by the arrival time of data. Thus, as the sampling frequency goes on increasing, it becomes difficult to secure sufficient time for performing a digital computation.

To avoid such a problem, the digital computing unit 9 in the protective relay device according to the first embodiment is configured to perform a periodic digital computation irrespective of the data receiving status of the data receiving circuit 5.

At the time of starting the digital computation, the digital computing unit 9 first verifies the time data stored in the latest time-data storing circuits 14a and 14b. If the time of the time data in each of the latest time-data storing circuits 14a and 14b is identical (or so slightly different that it can be deemed to be identical), the digital computing unit 9 performs the digital computation in an identical manner to that of the conventional protective relay device. On the other hand, if the time of the time data in each of the latest time-data storing circuits 14a and 14b is not identical, the digital computing unit 9 sets the time of the temporally older time data from among the two time data as a reference time, extracts time data having the same time as the reference time from the time-series instantaneous-value data storing circuits 13a and 13b, and then performs the digital computation.

Figure 4:
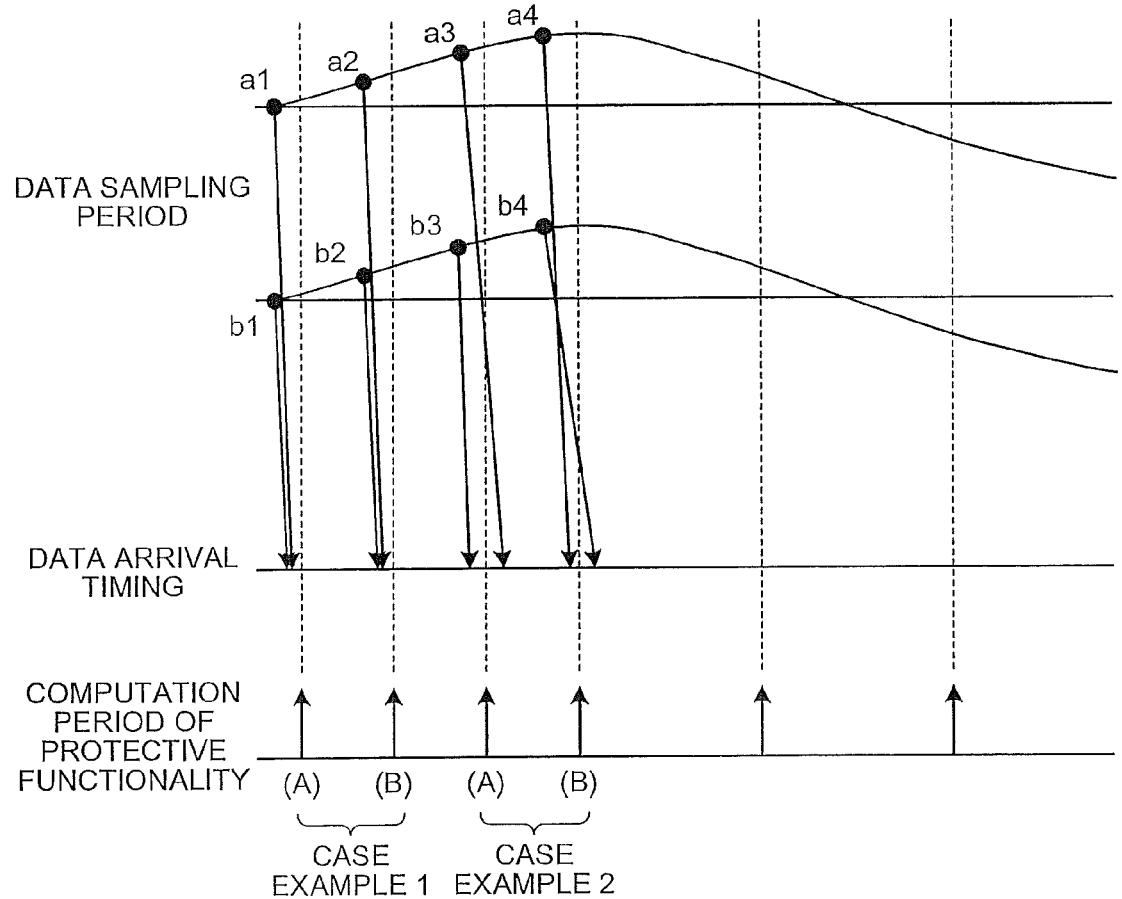
FIG. 4 is a schematic diagram for explaining digital computation performed by the protective relay device shown in FIG. 1.

The details of digital computation are described with reference to FIG. 4. In case examples 1(A) and 1(B) in FIG. 4, the starting timing of digital computation arrives after all of the data reaches a data storing circuit. In that case, the digital computation is performed in an identical manner to that of conventional techniques.

On the other hand, in case examples 2(A) and 2(B) in FIG. 4, data a3 and data b4 reach a data storing circuit at a later timing than the starting timing of digital computation.

For example, in the case example 2(A), because the data a3 reaches at a later timing than the starting timing of digital computation, data a2 and data b3 that have reached earlier than the data a3 are subjected to comparison and the time of the data a2, which is the temporally older data, is set as the reference time. Consequently, the digital computing unit 9 reads the data a2 from the time-series instantaneous-value data storing circuit 13a and reads data b2, which has the same time as that of the data a2, from the time-series instantaneous-value data storing circuit 13b and performs digital computation by the use of the data a2 and the data b2.

In the case example 2(B), because the data b4 reaches at a later timing than the starting timing of digital computation, data a4 and the data b3 that have reached earlier than the data b4 are subjected to comparison and the time of the data b3, which is the temporally older data, is set as the reference time. Consequently, the digital computing unit 9 reads the data b3 from the time-series instantaneous-value data storing circuit 13b and reads the data a3, which has the same time as that of the data b3, from the time-series instantaneous-value data storing circuit 13a and performs digital computation by the use of the data b3 and the data a3.

Meanwhile, although the above description is given for the two digitizing units 4a and 4b and the two series of processing units corresponding to the two digitizing units 4a and 4b, the description is also applicable when three or more series are configured corresponding to three or more digitizing units.

In this way, according to the first embodiment, digital computation is performed by the use of the temporally oldest data from among the group of latest time data stored in a latest time-data storing circuit and the data that has an identical time to the reference time, which is the time of the temporally oldest data. Because of such a configuration, even if the data arrival time from each digitizing unit is different and even if not all the data reaches before the starting timing of digital computation, it becomes possible to perform periodic digital computation. Moreover, it is possible to perform digital computation even at a timing at which the latest data cannot be used because of bad data. That enables to secure the continuity of digital computation.

In the above description according to the first embodiment, digital computation can be performed even when some of the data stored in the latest time-data storing circuits 14a and 14b reaches at a later timing than the starting timing of digital computation. According to a second embodiment of the present invention described below, a protective relay device is additionally equipped with a phase shift correction functionality that is used when a phase shift occurs due to the time difference in the sampling timing of the data output by the time-series data buffer circuits 11a and 11b.

Figure 5:
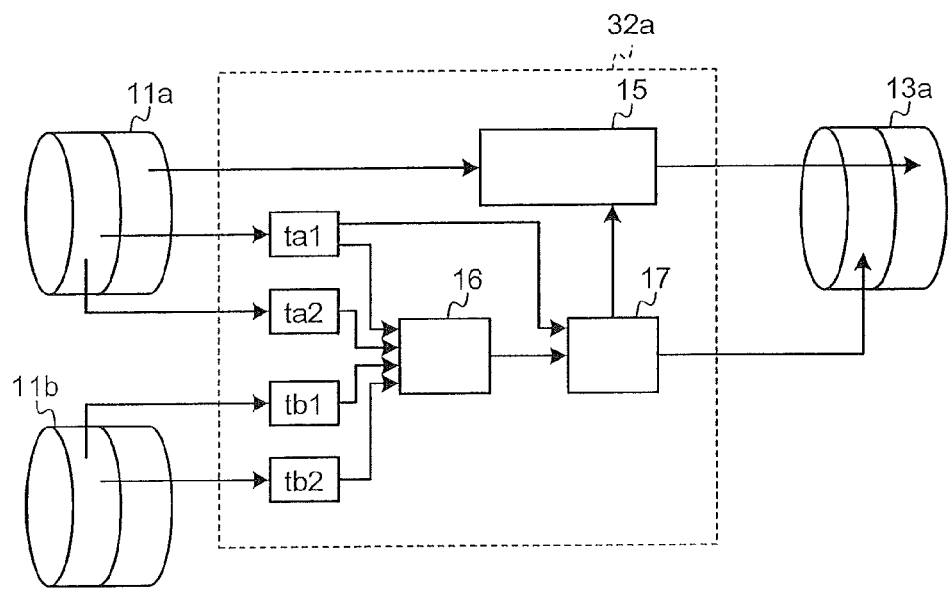
FIG. 5 is a schematic diagram for explaining an exemplary configuration of essential parts in a protective relay device according to a second embodiment of the present invention.

FIG. 5 is a schematic diagram for explaining an exemplary configuration of essential parts in the protective relay device according to the second embodiment. The protective relay device according to the second embodiment is configured by replacing the digital filtering processing circuit 12a shown in FIG. 1 with a phase-correctionable digital filtering processing circuit 32a shown in a dashed portion in FIG. 5. Moreover, the protective relay device according to the second embodiment is configured such that the phase-correctionable digital filtering processing circuit 32a receives time data from the time-series data buffer circuit 11a as well as from the time-series data buffer circuit 11b.

The phase-correctionable digital filtering processing circuit 32a includes a time data monitoring circuit 16 that iteratively monitors the time difference (sampling time difference) between the data output by the time-series data buffer circuit 11a and the data output by the time-series data buffer circuit 11b, a phase correction constant circuit 17 that calculates and retains a phase correction value based on the monitoring result of the time data monitoring circuit 16, and a digital filtering processing circuit 15 that performs predetermined digital filtering process and performs phase correction described later by the use of the phase correction value retained by the phase correction constant circuit 17.

Given below is the description of operations in the protective relay device according to the second embodiment. First, the data receiving circuit 5 receives sampling data output by the digitizing unit 4a and stores the received data in the time-series data buffer circuit 11a according to the data classification (series). Till this stage, the operations are identical or equivalent to those described in the first embodiment. Subsequently, the time data monitoring circuit 16 monitors times ta1 and ta2 of the sampling data output by the time-series data buffer circuit 11a and times tb1 and tb2 of the sampling data output by the time-series data buffer circuit 11b and determines whether ta1=tb1 and whether ta2=tb2. If ta1=tb1 and ta2=tb2, then there is no need to perform phase correction.

On the other hand, if ta1≠tb1 or ta2≠tb2, the time data monitoring circuit 16 performs calculates a phase correction value td as td=ta1−tb1(≈ta2−tb2) and stores the phase correction value td in the phase correction constant circuit 17. Phase correction can be performed by using, for example, a compensation formula (interpolant) given below in Equation (1).

$$Xta1' = Xta1 + (Xta1 - Xta2) \times td / (ta1 - ta2) \quad (1)$$
$$= Xta1 + (Xta1 - Xta2) \times (ta1 - tb1) / (ta1 - ta2)$$

where, Xta1 represents the sampling data at the sampling time ta1, Xta2 represents the sampling data at the sampling time ta2, and Xta1' represents the data after performing phase correction on the sampling data Xta1 with reference to the sampling time tb1.

Meanwhile, apart from using Equation (1), phase correction can also be performed by using the technique disclosed in, for example, Japanese Patent Application Laid-open No. H07-131923.

Reverting to FIG. 5, the digital filtering processing circuit 15 performs phase correction based on the phase correction value td retained by the phase correction constant circuit 17. Moreover, the phase correction value td, the sampling times, and the sampling data are stored in the time-series instantaneous-value data storing circuit 13a.

Figure 6:
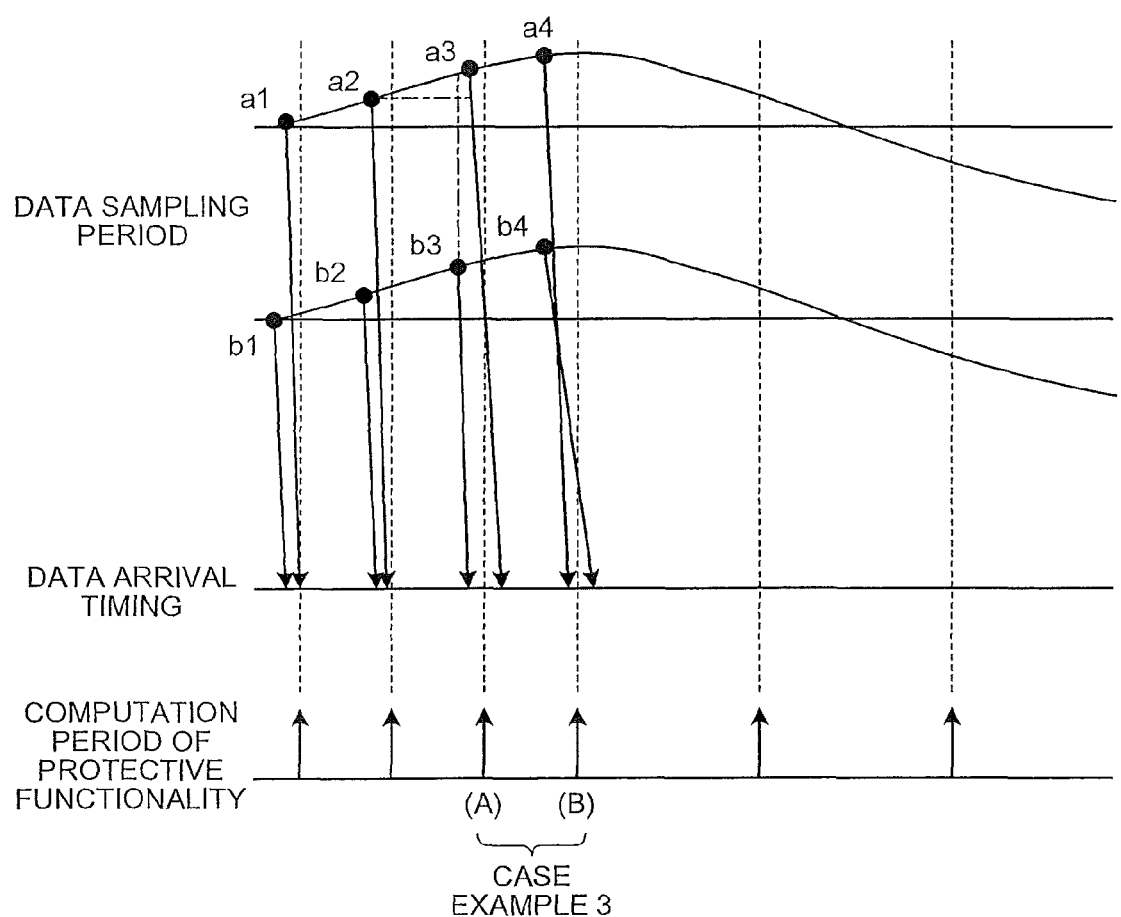
FIG. 6 is a schematic diagram for explaining digital computation performed by the protective relay device shown in FIG. 5.

The details of digital computation are described with reference to FIG. 6. In case examples 3(A) and 3(B) in FIG. 6, the data a3 and the data b4 reach a data storing circuit at a later timing than the starting timing of digital computation.

In the case example 3(B), because the data b4 reaches at a later timing than the starting timing of digital computation, the data a4 and the data b3 that have reached earlier than the data b4 are subjected to comparison and the time of the data b3, which is the temporally older data, is set as the reference time. In an identical situation according to the first embodiment, the digital computing unit 9 reads the data a3, which has the same time as that of the data b3, and performs digital computation by the use of the data b3 and the data a3. However, in the case example 3(B), the time of the data a3, which is deemed to be identical to the time of the data b3, is different than the time of the data b3. That causes a phase shift between the data b3 and the data a3. Thus, according to the second embodiment, the time of the data b3 is set as the reference time and phase correction is performed on the data a3 by using, for example, Equation (1).

The description with reference to FIG. 5 is given for the series configured toward the time-series instantaneous-value data storing circuit 13a (i.e., the series corresponding to the digitizing unit 4a; hereinafter, "series a"). An identical series can also be configured toward the time-series instantaneous-value data storing circuit 13b (i.e., the series corresponding to the digitizing unit 4b; hereinafter, "series b"). In the case example 3(B) described above, phase correction of the data a3 is performed with reference to the data b3. On the contrary, for example, to perform phase correction of the data b3 with reference to the data a3, operations can be performed in the series b in an identical manner to the operations performed in the series a.

Moreover, although the digital filtering processing circuit 15 shown in FIG. 5 is configured to perform the dual functionality of digital filtering and phase correction, it is also possible to arrange separate components to perform those functions. For example, the digital filtering processing circuit 15 can be configured not to perform phase correction and a processing circuit having phase correction functionality can be newly arranged between the digital filtering processing circuit 15 and the time-series instantaneous-value data storing circuit 13a, which is arranged subsequent to the digital filtering processing circuit 15.

In this way, according to the second embodiment, when sampling data at identical times arrives with a time difference from each time-series data buffer circuit, the data that has reached at the oldest time is set as the reference data and correction (phase correction) of the remaining data is performed with reference to the reference data. As a result, in addition to the advantageous effect achieved according to the first embodiment, digital computation can be performed even if there is a mismatch in the sampling times (i.e., phase shift in data strings) in each digitizing unit.

As described above according the first embodiment, digital computation can be performed even when some of the data reaches at a later timing than the starting timing of the digital computation. Moreover, according to the second embodiment, phase shift occurring due to the sampling time difference can be corrected. However, the description in the first two embodiments is based on the premise that the sampling frequencies are identical (including substantially identical). On the contrary, a protective relay device according to a third embodiment of the present invention is described below that can handle non-identical sampling frequencies. However, the description in the third embodiment is based on the premise that the high-low relation of the non-identical sampling frequencies is known (determined in advance).

Figure 7:
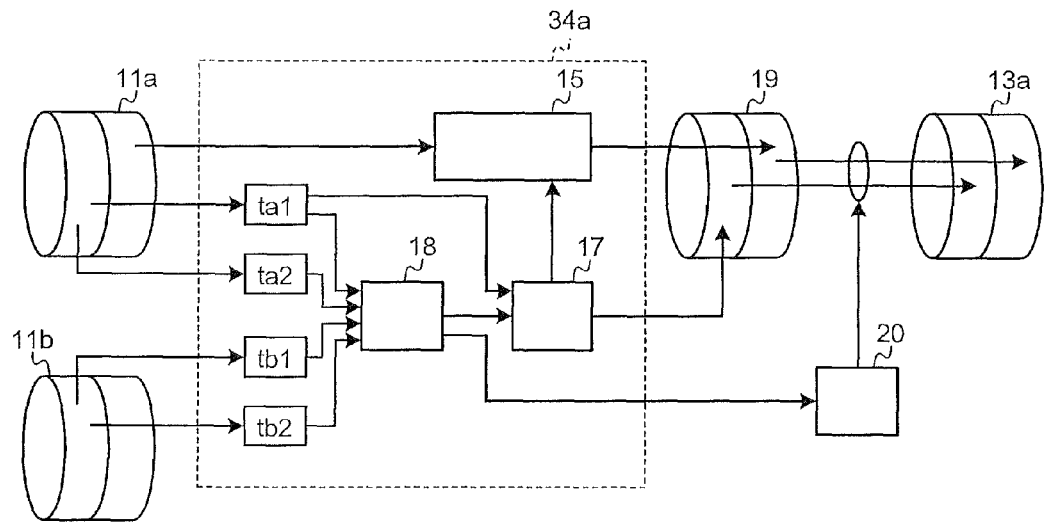
FIG. 7 is a schematic diagram for explaining an exemplary configuration of essential parts in a protective relay device according to a third embodiment of the present invention.

FIG. 7 is a schematic diagram for explaining an exemplary configuration of essential parts in the protective relay device according to the third embodiment. The protective relay device according to the third embodiment is configured by replacing the phase-correctionable digital filtering processing circuit 32a including the time data monitoring circuit 16 shown in FIG. 5 with a phase-correctionable digital filtering processing circuit 34a including a sampling frequency verifying circuit 18 and arranging a second time-series instantaneous-value data storing circuit 19 and a data transfer control unit 20 at the output side of the phase-correctionable digital filtering processing circuit 34a. The configuration shown in FIG. 7 corresponds to the case when the sampling frequency of the data stored in the time-series data buffer circuit 11a is higher than the sampling frequency of the data stored in the time-series data buffer circuit 11b. That is, in FIG. 7, the configuration of only the series a of higher sampling frequency is shown and the configuration of the series b of lower sampling frequency is omitted. The series b of lower sampling frequency can be configured by arranging the digital filtering processing circuit 12 shown in FIG. 1 or the phase-correctionable digital filtering processing circuit 32a shown in FIG. 5 between the time-series data buffer circuit 11b and the time-series instantaneous-value data storing circuit 13b.

The sampling frequency verifying circuit 18 determines whether a phase correction value is calculated for each new data input, accordingly calculates the phase correction value, stores the phase correction value in the phase correction constant circuit 17. Moreover, when there is a difference in sampling frequencies, the sampling frequency verifying circuit 18 generates a control signal for controlling data transfer from the second time-series instantaneous-value data storing circuit 19 to the time-series instantaneous-value data storing circuit 13a and outputs the control signal to the data transfer control unit 20. Based on the control signal, the data transfer control unit 20 controls data transfer from the second time-series instantaneous-value data storing circuit 19 to the time-series instantaneous-value data storing circuit 13a.

Given below is the description of operations in the protective relay device according to the third embodiment. First, the data receiving circuit 5 receives the sampling data output by the series a and stores the received data in the time-series data buffer circuit 11a according to the data classification. The sampling frequency verifying circuit 18 calculates the phase correction value td based on the monitoring result of the times ta1, ta2, tb1, and tb2 of the sampling data and stores the phase correction value td in the phase correction constant circuit 17. The digital filtering processing circuit 15 performs phase correction based on the phase correction value td retained by the phase correction constant circuit 17. Till this stage, the operations are identical or equivalent to the operations described in the second embodiment.

Subsequently, the sampling times and the sampling data output by the digital filtering processing circuit 15 and the phase correction value td retained by the phase correction constant circuit 17 is temporarily stored in the second time-series instantaneous-value data storing circuit 19. Because the data stored in the second time-series instantaneous-value data storing circuit 19 is output by the series a of higher sampling frequency, data intervals are narrower than the data output by the series b of lower sampling frequency. If nothing is done against such a situation, the data output by the series b of lower sampling frequency is intermittently lost thereby making it impossible for the digital computing unit 9 to perform continuous digital computation. To guard against such a problem, the data transfer control unit 20 controls the data transfer from the second time-series instantaneous-value data storing circuit 19 to the time-series instantaneous-value data storing circuit 13a such that the number of data output by the series a and the series b is same. For that, some of the data retained by the second time-series instantaneous-value data storing circuit 19 (some of the data output by the series a) is removed before storing the remaining data in the time-series instantaneous-value data storing circuit 13a.

Figure 8:
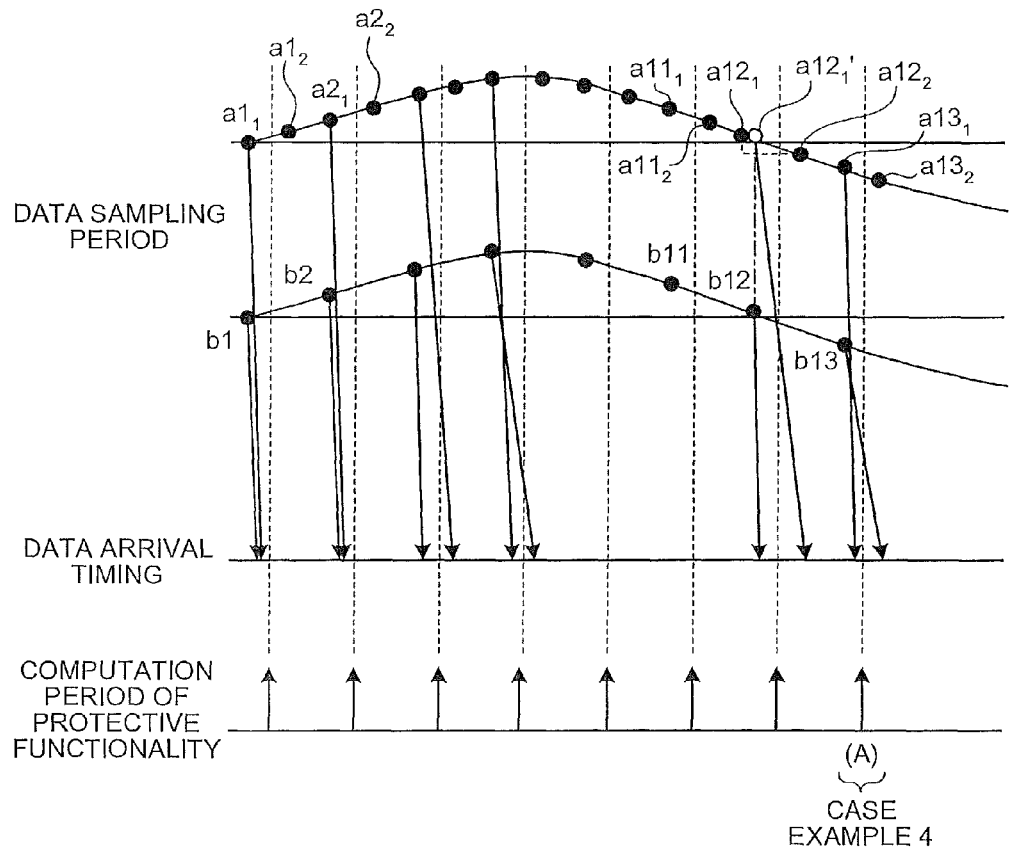
FIG. 8 is a schematic diagram for explaining digital computation performed by the protective relay device shown in FIG. 7.

The details of digital computation are described with reference to FIG. 8. In the example shown in FIG. 8, it is assumed that the sampling frequency of the series a is about double than the sampling frequency of the series b. As shown in FIG. 8, the sampling data of the series a are "$a1_1, a1_2, a2_1, a2_2, \ldots, a11_1, a11_2, a12_1, a12_2, a13_1, a13_2, \ldots$" and the sampling data of the series b are "b1, b2, . . . , b11, b12, b13, . . . ".

In a case example 4(A) in FIG. 8, because the data b13 of the series b reaches at a later timing than the starting timing of digital computation, the data $a13_1$ and the data b12 that have reached earlier than the data b13 are subjected to comparison and the time of the data b12, which is the temporally older data, is set as the reference time. However, the time of the data $a12_1$, which is deemed to be identical to the time of the data b12, is different than the time of the data b12. That causes a phase shift between the data b12 and the data $a12_1$. Thus, the time of the data b12 is set as the reference time and phase correction is performed on the data $a12_1$ by using, for example, abovementioned Equation (1). More particularly, the time of the data b12 is set as the reference time and phase correction is performed by the use of the data $a12_1$ and the data $a12_2$. That results in the generation of post phase-correction data $a12_1'$. Meanwhile, in an identical manner to that described in the second embodiment, it is also possible to perform phase correction by the use of the data $a12_1$ and the data $a13_1$.

Moreover, although the digital filtering processing circuit 15 shown in FIG. 7 is configured to perform the dual functionality of digital filtering and phase correction, it is also possible to arrange separate components to perform those functions. For example, the digital filtering processing circuit 15 can be configured not to perform phase correction and a processing circuit having phase correction functionality can be newly arranged between the digital filtering processing circuit 15 and the second time-series instantaneous-value data storing circuit 19, which is arranged subsequent to the digital filtering processing circuit 15.

In this way, according to the third embodiment, when the high-low relation of non-identical sampling frequencies of digitizing units is determined in advance, phase correction is performed by the use of a phase correction constant, which is calculated by using the information regarding the time difference between the data stored in a time-series data buffer circuit corresponding to a digitizing unit having the lowest sampling frequency and the data stored in a time-series data buffer circuit corresponding to other digitizing units. Subsequently, only the post phase-correction data corresponding to the sampling frequency of the digitizing unit having the lowest sampling frequency is transferred to a time-series instantaneous-value data storing circuit. As a result, in addition to the advantageous effect achieved according to the first two embodiments, it becomes possible to perform asynchronous and periodic digital computation even if the sampling frequency of each digitizing unit is different and even if there is a time difference in the arrival time of data to a digital computing unit.

As described above, the protective relay device according to the third embodiment is configured to perform protective relaying when the sampling frequency of each digitizing unit is different, based on the premise that the high-low relation of the non-identical sampling frequencies is determined in advance. On the contrary, a protective relay device described below according to a fourth embodiment of the present invention is configured to perform protective relaying when information regarding the sampling frequency of each digitizing unit is not known in advance (not yet determined).

Figure 9:
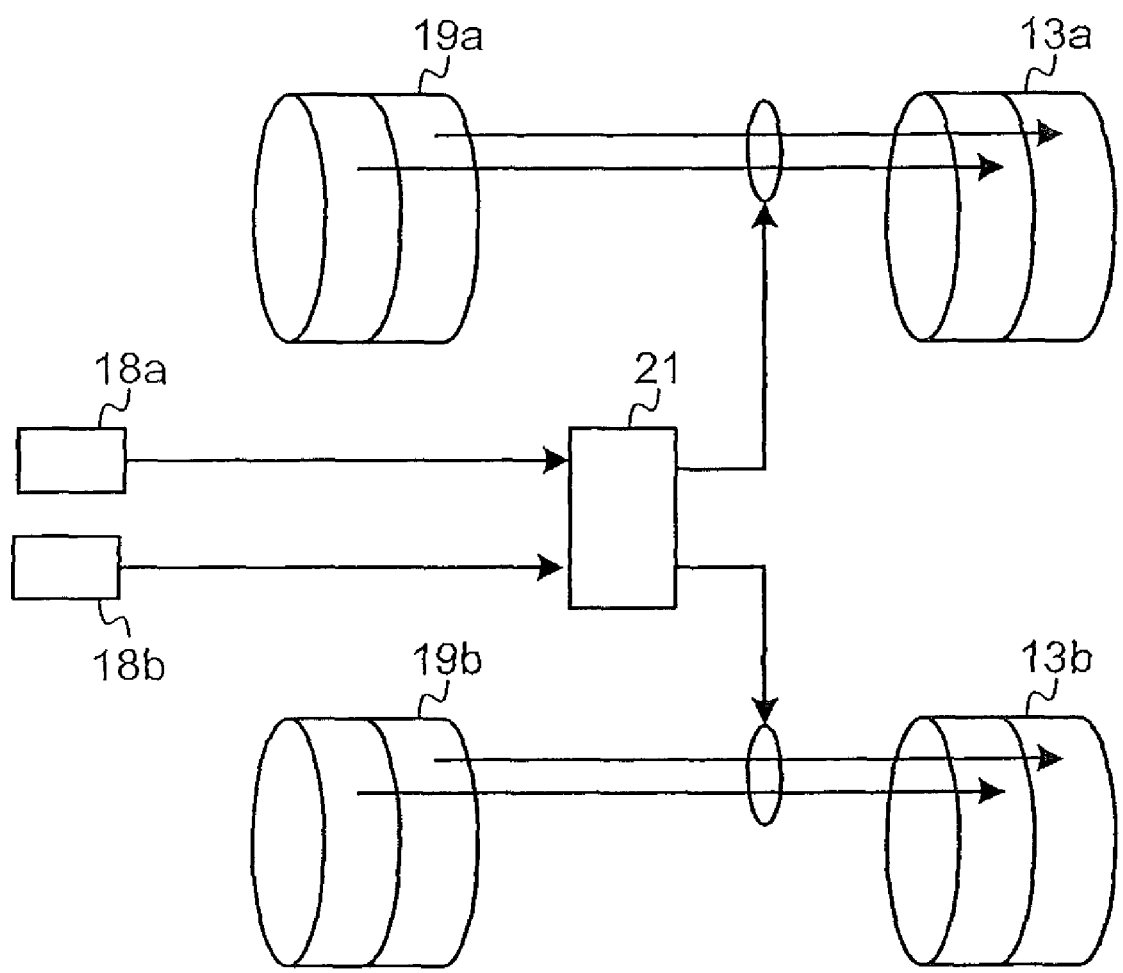
FIG. 9 is a schematic diagram for explaining an exemplary configuration of essential parts in a protective relay device according to a fourth embodiment of the present invention.

FIG. 9 is a schematic diagram for explaining an exemplary configuration of essential parts in the protective relay device according to the fourth embodiment. More particularly, FIG. 9 is a schematic diagram for explaining an exemplary circuit configuration arranged subsequent to the phase-correction-able digital filtering processing circuit 34a shown in FIG. 7. As shown in FIG. 9, the protective relay device includes sampling frequency verifying circuits 18a and 18b, second time-series instantaneous-value data storing circuits 19a and 19b, and a data transfer control unit 21.

The sampling frequency verifying circuits 18a and 18b are arranged in the phase-correctionable digital filtering processing circuit 34a (not shown in FIG. 9 for clarity) corresponding to the two series (see FIG. 7). Identical to the description in the third embodiment, each of the sampling frequency verifying circuits 18a and 18b performs the dual functionality of verifying the difference in sampling frequencies and calculating a phase correction value. Based on control signals output by the sampling frequency verifying circuits 18a and 18b, the data transfer control unit 21 controls data transfer from the second time-series instantaneous-value data storing circuit 19a to the time-series instantaneous-value data storing circuit 13a and data transfer from the second time-series instantaneous-value data storing circuit 19b to the time-series instantaneous-value data storing circuit 13b, respectively.

Given below is the description of operations in the protective relay device according to the fourth embodiment. The sampling frequency verifying circuit 18a uses the times ta1 and ta2 of the sampling data output by the time-series data buffer circuit 11a and monitors a time difference Δta (Δta=ta1−ta2). Similarly, the sampling frequency verifying circuit 18b uses the times tb1 and tb2 of the sampling data output by the time-series data buffer circuit 11b and monitors a time difference Δtb (Δtb=tb1−tb2). Based on the corresponding monitoring result, the sampling frequency verifying circuits 18a and 18b verify the sampling frequencies of the corresponding series (series a and series b, respectively). Moreover, if phase correction is necessary in each series, the digital filtering processing circuit 15 (see FIG. 7) performs phase correction and the post phase-correction data is temporarily stored in the corresponding second time-series instantaneous-value data storing circuit 19 (19a and 19b, respectively).

Herein, the data stored in the second time-series instantaneous-value data storing circuit 19a has different sampling intervals than the data stored in the second time-series instantaneous-value data storing circuit 19b. As a result, the digital computing unit 9 needs to perform digital computation with non-identical data intervals. To avoid such a problem, the data transfer control unit 21 controls the second time-series instantaneous-value data storing circuit 19 (19a and 19b) based on the control signals output by the sampling frequency verifying circuits 18a and 18b such that the number of data is matched to the series of the lowest sampling frequency. As a result, the data intervals of the data input to the time-series instantaneous-value data storing circuit 13 (13a and 13b) become identical.

In this way, according to the fourth embodiment, when the information regarding the sampling frequency of each digitizing unit is not known in advance, the time-series data buffer circuit arranged corresponding to the digitizing unit having the lowest sampling frequency is identified based on the information regarding the time difference between the data stored in the time-series data buffer circuit arranged corresponding to each digitizing unit. Subsequently, phase correction is performed by the use of a phase correction constant, which is calculated by using the information regarding the time difference between the data stored in a time-series data buffer circuit corresponding to a digitizing unit having the lowest sampling frequency and the data stored in a time-series data buffer circuit corresponding to other digitizing units. Then, only the post phase-correction data corresponding to the sampling frequency of the digitizing unit having the lowest sampling frequency is transferred to a time-series instantaneous-value data storing circuit. As a result, in addition to the advantageous effect achieved according to the first three embodiments, it becomes possible to perform asynchronous and periodic digital computation even if the sampling frequency of each digitizing unit is different, even if the sampling frequency of each digitizing unit is not known in advance, and even if there is a time difference in the arrival time of data to a digital computing unit.

Meanwhile, although the abovementioned embodiments are described with reference to a protective relay device that protects an electric power system, the embodiments are also applicable, for example, to a system monitoring apparatus or in the measuring field.

In this way, according to an aspect of the present invention, even if sampling frequencies of digitizing units that perform digitization of a plurality of system electrical quantities are not identical, it is possible to perform accurate and periodic relay computation without having to use a complicated configuration or complicated functionalities.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A protective relay device comprising:
    a data receiving circuit that receives data from a plurality of digitizing units each digitizing a system electrical quantity;
    a plurality of data buffer circuits each storing therein the data received by the data receiving circuit in time series for each of the digitizing units;
    a plurality of digital filtering processing circuits each performing a predetermined digital filtering process on an output of each of the data buffer circuits;
    a plurality of first data storing circuits each storing therein an output of each of the digital filtering processing circuits in time series as time data;
    a plurality of second data storing circuits each storing therein latest time data for each of the digitizing units from among time data stored in each of the first data storing circuits; and
    a digital computing unit that sets an oldest time from among latest times represented by the latest time data stored in the second data storing circuits as a reference time, extracts data at a same time as the reference time from the first data storing circuits, and performs a protective computation with extracted data.

2. The protective relay device according to claim 1, wherein when there is a time difference between arrival times of data stored in the data buffer circuits, which are regarded as the data at the same time as the reference time, each of the digital filtering processing circuits performs, using temporally oldest data from among the data having the time difference as a reference, a correction of remaining data and outputs corrected data to each of the first data storing circuits.

3. The protective relay device according to claim 1, wherein each of the digital filtering processing circuits includes a time data monitoring circuit that monitors the time difference between arrival times of data regarded as sampling data at an identical time from among the data stored in each of the data buffer circuits and a phase correction constant circuit that retains information regarding the time difference monitored by the time data monitoring circuit as a phase correction constant, and performs the correction of the remaining data by using the phase correction constant.

4. The protective relay device according to claim 1, further comprising:
    a plurality of third data storing circuits each being arranged between each of the digital filtering processing circuits and each of the first data storing circuits and storing therein data output from each of the digital filtering processing circuits; and
    a plurality of data transfer control units each controlling a data transfer from each of the third data storing circuits to each of the first data storing circuits, wherein
    each of the data transfer control units controls the data transfer such that corrected data exclusively corresponding to a sampling frequency of a digitizing unit having a lowest sampling frequency from among the digitizing units is transferred to each of the first data storing circuits.

5. The protective relay device according to claim 4, further comprising a plurality of sampling frequency verifying circuits each, when a magnitude relation between sampling frequencies of the digitizing units is determined in advance, calculating a phase correction constant based on information regarding a time difference between an arrival time of data corresponding to a digitizing unit having a lowest sampling frequency from among the digitizing units and an arrival time of data corresponding to remaining digitizing units from among data stored in the data buffer circuits.

6. The protective relay device according to claim 4, further comprising a plurality of sampling frequency verifying circuits each, when a magnitude relation between sampling frequencies of the digitizing units is not determined in advance, identifying data output from a digitizing unit having a lowest sampling frequency from among the digitizing units based on information regarding a time difference between the arrival times of the data stored in the data buffer circuits and calculates a phase correction constant based on information regarding the time difference between identified data and remaining data stored in the data buffer circuits.

7. A protective relay device comprising:
    a data receiving circuit that receives data from a plurality of digitizing units each digitizing a system electrical quantity;
    a data buffer circuit storing therein the data received by the data receiving circuit in time series for each of the digitizing units;
    a digital filtering processing circuit performing a predetermined digital filtering process on an output of the data buffer circuit;

a first data storing circuit storing therein an output of the digital filtering processing circuit in time series as time data;

a second data storing circuit storing therein latest time data for each of the digitizing units from among time data stored in the first data storing circuit; and a digital computing unit that sets an oldest time from among latest times represented by the latest time data stored in the second data storing circuit as a reference time, extracts data at a same time as the reference time from the first data storing circuit, and performs a protective computation with extracted data.

* * * * *